US011402489B2

(12) United States Patent
Yun et al.

(10) Patent No.: US 11,402,489 B2
(45) Date of Patent: Aug. 2, 2022

(54) PASSIVE MULTI-PERSON LOCATION TRACKING UTILIZING SIGNAL POLARIZATION

(71) Applicant: Hewlett Packard Enterprise Development LP, Houston, TX (US)

(72) Inventors: Sangki Yun, Palo Alto, CA (US); Kyu-Han Kim, Palo Alto, CA (US); Christina Vlachou, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 261 days.

(21) Appl. No.: 16/717,952

(22) Filed: Dec. 17, 2019

(65) Prior Publication Data
US 2021/0181332 A1 Jun. 17, 2021

(51) Int. Cl.
*G01S 13/72* (2006.01)
*G01S 7/02* (2006.01)
*G01S 13/00* (2006.01)

(52) U.S. Cl.
CPC ............ *G01S 13/726* (2013.01); *G01S 7/025* (2013.01); *G01S 13/003* (2013.01)

(58) Field of Classification Search
CPC ...... G01S 13/003; G01S 13/726; G01S 7/006; G01S 7/025
See application file for complete search history.

(56) References Cited

U.S. PATENT DOCUMENTS

| 6,774,791 | B2 | 8/2004 | Krubiner et al. |
| 7,969,311 | B2 | 6/2011 | Markhovsky et al. |
| 10,033,472 | B2 | 7/2018 | Mostofi et al. |
| 2015/0212199 | A1* | 7/2015 | Nakamura .............. G01S 13/89 342/118 |
| 2017/0338874 | A1* | 11/2017 | Pratt ........................ H04B 7/10 |
| 2017/0354349 | A1* | 12/2017 | Mohapatra ........... A61B 5/7203 |

(Continued)

OTHER PUBLICATIONS

Karanam, C et al., Tracking From One Side: Multi-person Passive Tracking with WiFi Magnitude Measurements, Apr. 16-19, 2019, < https://www.researchgate.net/publication/332214002_Tracking_from_one_side_multi-person_passive_tracking_with_WiFi_magnitude_measurements >.

(Continued)

*Primary Examiner* — Timothy X Pham
(74) *Attorney, Agent, or Firm* — Jaffery Watson Mendonsa & Hamilton

(57) ABSTRACT

Embodiments are directed to passive multi-person location tracking utilizing signal polarization. An embodiment of a system includes multiple receivers, including a first receiver at a first location and a second receiver at a second location, each receiver including one or more receiver antennas to receive polarized radio signals; a transmitter located at a third location to transmit polarized radio signals, the transmitter including antennas for a first signal at a first polarization direction and a second signal at a second, different polarization direction; and a processing system to receive channel state information from each receiver, and to track a plurality of individuals utilizing the received channel state information, wherein the tracking of the plurality of individuals is based at least in part on analysis of a polarization parameter and a set of location parameters generated for each of multiple reflection paths based on the channel state information.

20 Claims, 7 Drawing Sheets

(56) References Cited

U.S. PATENT DOCUMENTS

| | | | |
|---|---|---|---|
| 2019/0020425 A1* | 1/2019 | Zhang | H04W 4/027 |
| 2019/0052725 A1* | 2/2019 | Chen | H04W 4/027 |
| 2020/0132823 A1* | 4/2020 | Yun | H04B 7/0626 |
| 2020/0178835 A1* | 6/2020 | Liu | G01S 13/78 |
| 2021/0328647 A1* | 10/2021 | Tong | H04B 7/024 |

OTHER PUBLICATIONS

Alloulah, M, et al. On Tracking the Physicality of Wi-Fi: A Subspace Approach, Feb. 4, 2019, < https://arxiv.org/pdf/1810.04302.pdf >.

Adib et al., "3D Tracking via Body Radio Reflections", Proceedings of the 11th USENIX Symposium on Networked Systems Design and Implementation (NSDI '14), Apr. 2-4, 2014, pp. 317-329.

Adib et al., "Multi-Person Localization via RF Body Reflections", Proceedings of the 12th USENIX Symposium on Networked Systems Design and Implementation (NSDI '15), May 4-6, 2015, pp. 279-292.

Aruba, "Aruba 7200 Series Mobility Controllers", available online at <https://www.arubanetworks.com/products/networking/gateways-and-controllers/7200-series/> retrieved on Mar. 25, 2020, 6 pages.

Fessler et al., "Space-Alternating Generalized Expectation-Maximization Algorithm", IEEE, Oct. 1994, pp. 1-15.

Li et al., "Dynamic-MUSIC: Accurate device-free indoor Localization", Proceedings of the 2016 ACM International Joint Conference on Pervasive and Ubiquitous Computing, Sep. 12-16, 2016, 14 pages.

Li et al., "IndoTrack: Device-Free Indoor Human Tracking with Commodity Wi-Fi", Proceedings of the ACM on Interactive, Mobile, Wearable and Ubiquitous Technologies, vol. 1, No. 3, Article 72, Sep. 2017, pp. 72-72:22.

NETMIT Group, "WiTrack: 3D Motion Tracking Through Walls Using Wireless Signals", available online at <https://www.youtube.com/watch?v=sbFZPPC7REc>, Dec. 9, 2013, 5 pages.

Qian et al., "Widar2.0: Passive Human Tracking with a Single Wi-Fi Link", Association for Computing Machinery, Jun. 10-15, 2018, 12 pages.

Wang et al., "LiFS: Low Human-Effort, Device-Free Localization with Fine-Grained Subcarrier Information", Proceedings of the 22nd Annual International Conference on Mobile Computing and Networking, Oct. 3-7, 2016, 16 pages.

Xie et al., "mD-Track: Leveraging Multi-Dimensionality in Passive Indoor Wi-Fi Tracking", ACM, Dec. 10, 2018, 17 pages.

\* cited by examiner

US 11,402,489 B2

PASSIVE MULTI-PERSON LOCATION TRACKING UTILIZING SIGNAL POLARIZATION

BACKGROUND

Tracking of movement of individuals in certain locations can be essential for security and safety. While it is possible to track persons actively utilizing electronic devices, such tracking is often not possible, and thus passive tracking may be applied. Technologies that are designed for tracking and ranging operations, such as radar, may be applied for tracking, but these technologies require special technology and equipment that may be impractical in many environments.

While there are wireless technologies conventionally implemented for communications and data transfer, such as Wi-Fi, that may be applied in tracking, existing technology cannot provide tracking when multiple individuals are moving within a particular environment. If multiple people within a Wi-Fi signal range move simultaneously, the signals of multiple reflection paths also change, and existing technology does not allow for tracking when more than one signal path changes.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to passive multi-person location tracking utilizing signal polarization.

In some embodiments, a system or process is to provide for transmission of polarized signals and the reception of reflected signals at multiple different locations, the reflected signals being processed to passively detect and track multiple persons in a particular tracking environment. In some embodiments, the system or process utilizes a Wi-Fi transmitter transmitting at least a first signal in a first polarization direction and a second signal in a second polarization direction to enable tracking of multiple persons in the tracking environment through use of reflected signals received at each of multiple receivers.

The wireless signal arriving at the receiver side in a system is a combination of all of the signals that traverse through multiple signal reflection paths. By processing and analyzing the channel state information (CSI) provided by the Wi-Fi receiver, a system can estimate the characteristics of the signal path, such as angle of arrival (AoA) and time of flight (ToF). Using this data, the system can analyze the location of the reflector and then find the position of a person when the person is a main source of the reflection. Such a technique is called wireless signal-based human body tracking.

However, conventional technology approaches are unable to track when multiple individuals move simultaneously in a tracking environment. If multiple individuals within the Wi-Fi-signal range move simultaneously, the signals of multiple reflection paths also change. Existing tracking techniques are designed to consider a situation in which signals from a single path change, which is not applicable when more than one signal path changes.

In some embodiments, a tracking technology (which may be referred to herein as WiPolar) includes a passive multi-person tracking system that may utilize Wi-Fi devices (including commercial off-the-shelf (COTS) devices) to employ polarimetry in passive multi-person tracking. Polarimetry refers to a measure of signal (including Wi-Fi signals) polarization, which is applied to overcome the difficulty of separating multiple human reflections in a tracking environment.

Figure 1:
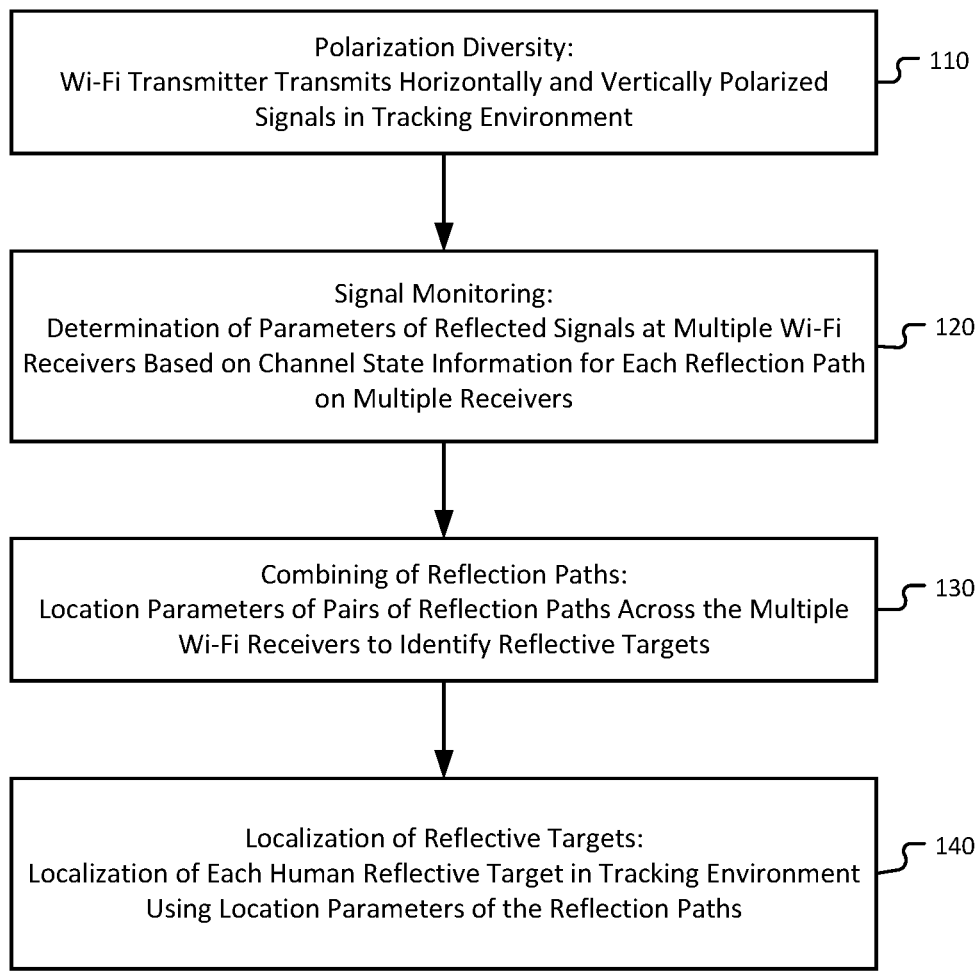
FIG. 1 is an illustration of passive multi-person location tracking utilizing signal polarization according to some embodiments.

FIG. 1 is an illustration of passive multi-person location tracking utilizing signal polarization according to some embodiments. In some embodiments, a system or process for passive multi-person location tracking operates as follows:

(1) Polarization Diversity 110: Polarization diversity is provided in a transmitted Wi-Fi signal that is used to illuminate a tracking environment. The transmitted signal may be transmitted by an apparatus such as Wi-Fi transmitter 210 illustrated in FIG. 2, with the Wi-Fi transmitter to transmit, for example, horizontally and vertically polarized signals.

Figure 2:
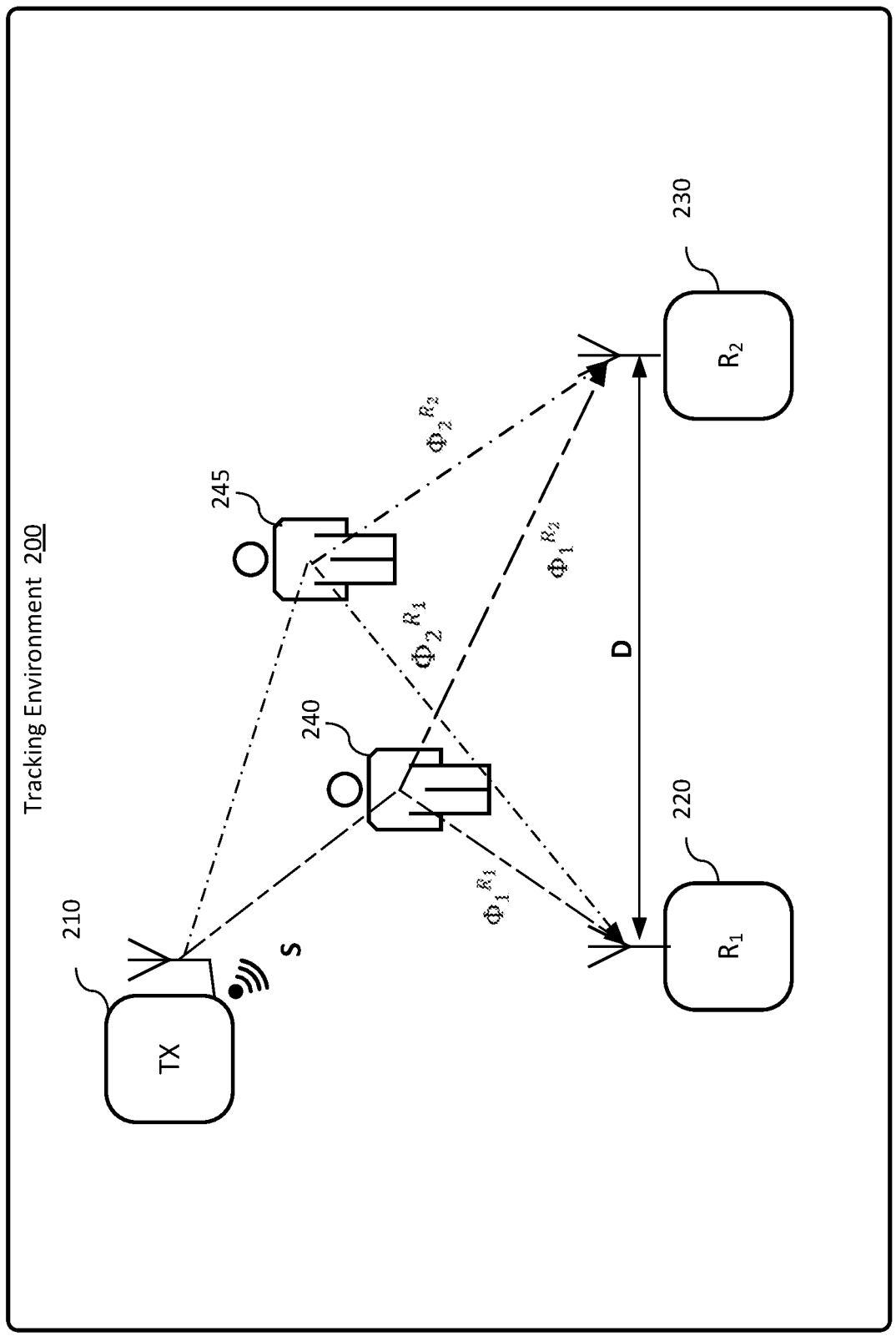
FIG. 2 illustrates a system architecture for passive multi-person location tracking utilizing signal polarization according to some embodiments.

(2) Signal Monitoring 120—A polarization parameter (polarization axial ratio angle) and a set of location-based parameters (ToF, AoA, DFS (Dynamic Frequency Selection)) are continuously determined for each reflection path on multiple Wi-Fi receivers (such as the pair of Wi-Fi receivers 220 and 225 illustrated in FIG. 2).

(3) Combining of Reflection Paths 130—The location parameters of pairs of reflection paths across the two receivers that have the closest polarization parameter are combined to identify reflective targets.

(4) Localization of Reflective Targets 140—Each human reflective target in the tracking environment is localized using location parameters, including angles of arrival (AoA), of the human reflection paths at each of the multiple receivers.

The polarization of a transverse-electromagnetic (TEM) wave, such as a Wi-Fi signal, is a fundamental property that defines the spatial orientation of the wave's electric field oscillation. In some embodiments, by orienting a pair of co-located antennas of the Wi-Fi transmitter in vertical and horizontal directions (or other differing directions), a transmitter is to simultaneously generate a pair of vertical and horizontal polarized Wi-Fi signals. In such operation, a vertically oriented antenna transmits a signal in which the sinusoidal oscillations of its electric field occur perpendicular to the ground, which is referred to as vertical polarization, while a horizontally polarized antenna transmits a signal in which the sinusoidal oscillations of its electric field occur parallel to the ground, referred to as horizontal polarization.

In some embodiments, a pair of differently polarized transmit signals, such as a first Wi-Fi signal with vertical polarization and a second Wi-Fi signal with horizontal polarization, interact with reflectors in the tracking environment, wherein the reflectors may be humans and varying obstacles, that possess unique horizontal and vertical radar cross-sections owing to their physical dimensions and reflection characteristics. The reflected Wi-Fi signals in the tracking environment undergo different amounts of attenuation in the horizontal and vertical polarization before reaching one of multiple Wi-Fi receivers.

In some embodiments, the system or process measures a ratio of the amplitudes of the polarized signals in the horizontal and vertical axis at the receiver, and estimates a polarization axial ratio angle. The estimation of the polarization axial ratio angle assists in obtaining a more accurate estimation of location-based parameters for multiple person tracking. It may be noted that the CSI amplitude suffers from less random noise than the phase, such as carrier frequency offset (CFO) and sampling time offset (STO), and thus the polarization angle estimated from the amplitude measurements is cleaner and more stable compared to the other phase-based location tracking parameters such as AoA, DFS and ToF. For this reason, a system process estimates the relatively stable polarization axial ratio angle jointly with the less stable phase-based location tracking parameters, resulting in more stable location parameters for the targets than would be generated by estimation of phase-based location tracking parameters alone. The estimated directions of each target from the perspective of two receivers thus be applied to provide a confident estimate of a target's actual location in a tracking environment.

As used herein, access point (AP) (also referred to as a wireless access point (WAP)) refers to a Wi-Fi networking hardware device that allows Wi-Fi devices to connect to a wired network, including connection to the Internet or an intranet. The AP may connect to a router (via a wired network) as a standalone device, or may be an integral component of the router itself.

A Wi-Fi signal is a transverse electro-magnetic (TEM) wave comprised of electric and magnetic fields that oscillate in the same phase but having their plane of oscillations perpendicular to each other. Assuming the EM wave propagates along the Z-axis, its electric field can oscillate at any angle $\gamma$ to the XZ plane. This angle, called the polarization axial ratio angle is determined by the arctangent of the ratio of the instantaneous magnitudes of the electric field component on the Y-axis to the electric field component on the X-axis. The TEM wave is said to be linearly polarized if $\gamma$ does not vary over space or time. Formally, the instantaneous electric field vector $\vec{E}$ of a TEM wave $Ae^{-j(2+ft-kz)}$ of frequency $f$ at time $t$ and spatial position $z$ (i.e., along the Z-axis) and spatial phase factor $$k = 2\pi/\lambda k = \frac{2\pi}{\lambda}$$

can be represented as the vector sum of two components along the X and Y axes, as:

$$\vec{E} = \vec{e}_x E_x + \vec{e}_y E_y \quad [1]$$

Where:

$\vec{e}_x$ and $\vec{e}_y$=unit vectors along the X-axis and Y-axis, respectively $E_x = A_x e^{-j(2\pi ft - kz)}$=the X-component of $\vec{E}$ $E_y = A_y e^{-j(2\pi ft - kz + \phi)}$=the Y-component of $\vec{E}$ $\phi$=the phase difference between the X and Y components.

The polarization axial ratio angle $\gamma$ is thus given by:

$$\gamma = \arctan\left(\frac{|E_y|}{|E_x|}\right) \quad [2]$$

Depending on the values of $A_x$, $A_y$, and $\phi$, three types of polarization can be present: linear polarization (LP), circular polarization (CP), and elliptical polarization (EP). In linear polarization, the value of $\phi$ is always zero, and thus the orientation of the plane of the electric field does not change during the propagation of the TEM irrespective of the value of $A_x$ and $A_y$. Further, there are two special cases of linear polarization: vertical polarization and horizontal polarization. A TEM wave is said to be vertically polarized if $\phi=0$, $A_x=0$, and $A_y \neq 0$, and horizontally polarized if $\phi=0$, $A_x \neq 0$, and $A_y=0$. However, if $\phi \neq 0$, the X-component will lead (for positive $\phi$) or lag the Y-component (for negative $\phi$) over time, resulting in the tip of the electric field vector E to be described as an ellipse as the TEM wave propagates, for which the TEM wave is said to be elliptically polarized. Further, a special case of elliptical polarization, referred to as circular polarization, occurs when the amplitudes of the X and Y components are equal and orthogonal (i.e., $A_x=A_y$) and $\phi=\pi/2$, referred to as right-hand circular polarization (RHCP) (or if $A_x=A_y$ and $\phi=-\pi/2$, referred to as Left-Hand Circular Polarization (LHCP)).

FIG. 2 illustrates a system architecture for passive multi-person location tracking utilizing signal polarization according to some embodiments. In some embodiments, a Wi-Fi transmitter access point (TX) 210 (also referred to herein as a Wi-Fi transmitter) located in a tracking environment transmits Wi-Fi packets at a certain fixed rate. The tracking environment 200 may be any physical environment, but in particular may include a building or campus, for example a medical, industrial, or educational institution. The Wi-Fi signal (S) of a packet from the transmitter is generated by a pair of spatially collocated polarized antennas, and in particular may be horizontally and vertically polarized antennas, such as illustrated in FIG. 4A. The signal operates to illuminate the tracking environment 200 simultaneously along F narrowband frequencies, which are referred to as subcarriers.

Figure 3A:
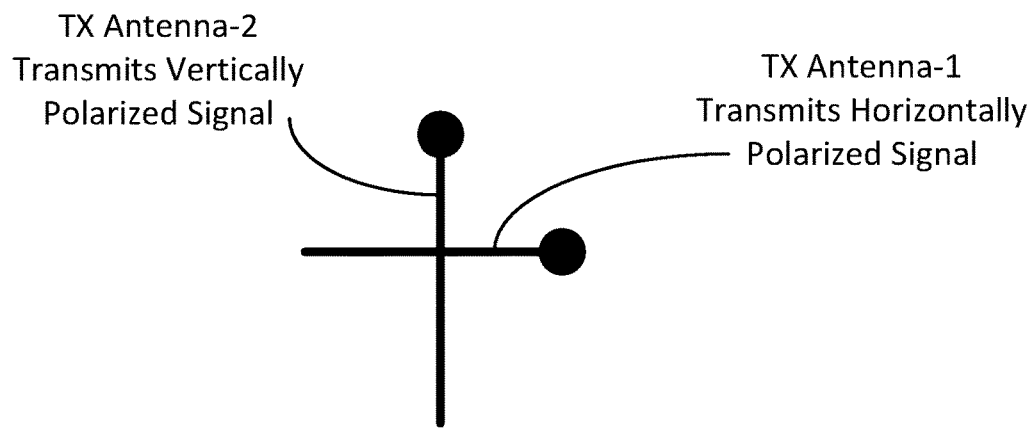
FIG. 3A illustrates a transmitter antenna structure for human-body tracking according to some embodiments.
Figure 3B:
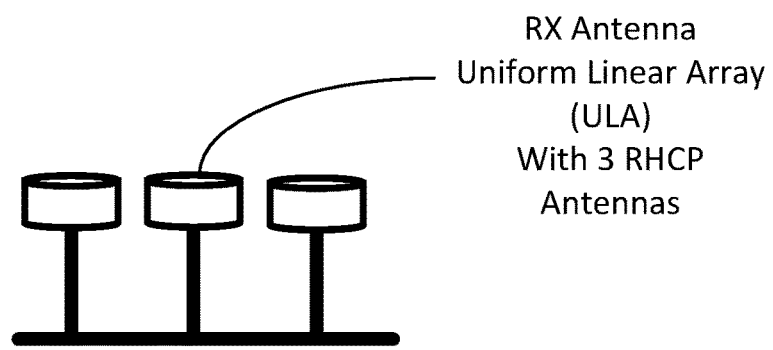
FIG. 3B illustrates a receiver antenna structure for human-body tracking according to some embodiments.

The transmitted signal of each subcarrier propagates in both of the horizontal and vertical polarizations along L paths from the transmitter to multiple Wi-Fi receivers, illustrated as a first Wi-Fi receiver access point ($R_1$) 220 and a second Wi-Fi receiver access point ($R_2$) 230 (also referred to herein as a Wi-Fi receiver), each Wi-Fi receiver including a uniform linear array (ULA) of antennas, such as illustrated in FIG. 3B. Each of the L paths can interact with stationary and moving objects in the tracking environment 200, such as walls (or other structures), obstacles, and human targets of interest, and consequently undergo change in amplitude and phase in both horizontal and vertical polarized components. The antennas of receivers may be located a certain distance D apart, where D is at least one wavelength.

For example, the tracking environment 200 may include multiple persons who may be in motion, the persons in one example including a first person 240 and a second person 245, each of whom may be moving in any direction along any path. Wi-Fi receivers 220 and 230 thus each can receive reflected Wi-Fi signals from both of the persons 240 and 245, as well as reflected signals from any other structure, obstacle, or person in the tracking environment. The signals received at Wi-Fi receiver 220 include a signal ($\Phi_1^{R_1}$) reflected from person 240 and a signal ($\Phi_2^{R_1}$) reflected from person 245, and the signals received at Wi-Fi receiver 230 include a signal ($\Phi_1^{R_2}$) reflected from person 240 and a signal ($\Phi_2^{R_2}$) reflected from person 245.

In some embodiments, the signals received at Wi-Fi receivers 220-230 are analyzed to locate and track the persons 240-245 in the tracking environment. In some embodiments, the analysis is performed by a processing system, such as location tracking server 450 illustrated in FIG. 4. The processing system may include a Wi-Fi network controller or a dedicated processing server. However, in other embodiments the analysis may be provided using a different structure, including the use multiple processing systems, processing by remote cloud systems, or processing at least in part within one or more of the Wi-Fi receivers. It is further noted that the Wi-Fi transmitter 210 and the Wi-Fi receivers 220-230 may include both transmission and reception capability, and may include other wireless and wired communication capabilities.

In some embodiments, a tracking system may be expanded to three-dimensional (3D) operation. The system architecture in such operation may further including one or more additional receivers that are a certain distance from Wi-Fi receivers 220 and 230 along a third axis such as a Z-axis if it is assumed that FIG. 2 illustrates the system elements along X- and Y-axis.

FIG. 3A illustrates a transmitter antenna structure for human-body tracking and FIG. 3B illustrates a receiver antenna structure for human-body tracking according to some embodiments. As shown in FIG. 3A, a transmitter (TX) antenna structure 300 includes TX antenna-1 to transmit a horizontally polarized signal and TX antenna-2 to transmit a vertically polarized signal. In some embodiments, TX antenna-1 and TX antenna-2 are co-located at a Wi-Fi transmitter, such as Wi-Fi transmitter 210 illustrated in FIG. 2. However, the arrangement of TX antenna-1 and TX antenna-2 in relation to each other may vary from the illustration provided in FIG. 3A depending on the antenna design utilized for the transmitter.

As shown in FIG. 3B, a receiver (RX) antenna structure 350 for a Wi-Fi receiver, such as an antenna for each of Wi-Fi receivers 220 and 230 illustrated in FIG. 2, includes a uniform linear array (ULA) of antennas to receive the reflected horizontally polarized signals and vertically polarized signals. As illustrated in FIG. 3B, the antennas of the ULA may be a set (such as three) right-hand circular polarization (RHCP) antennas. Alternatively, the antennas of the ULA may be a set left-hand circular polarization (LHCP) antennas, with the calculations herein being modified accordingly.

Figure 4:
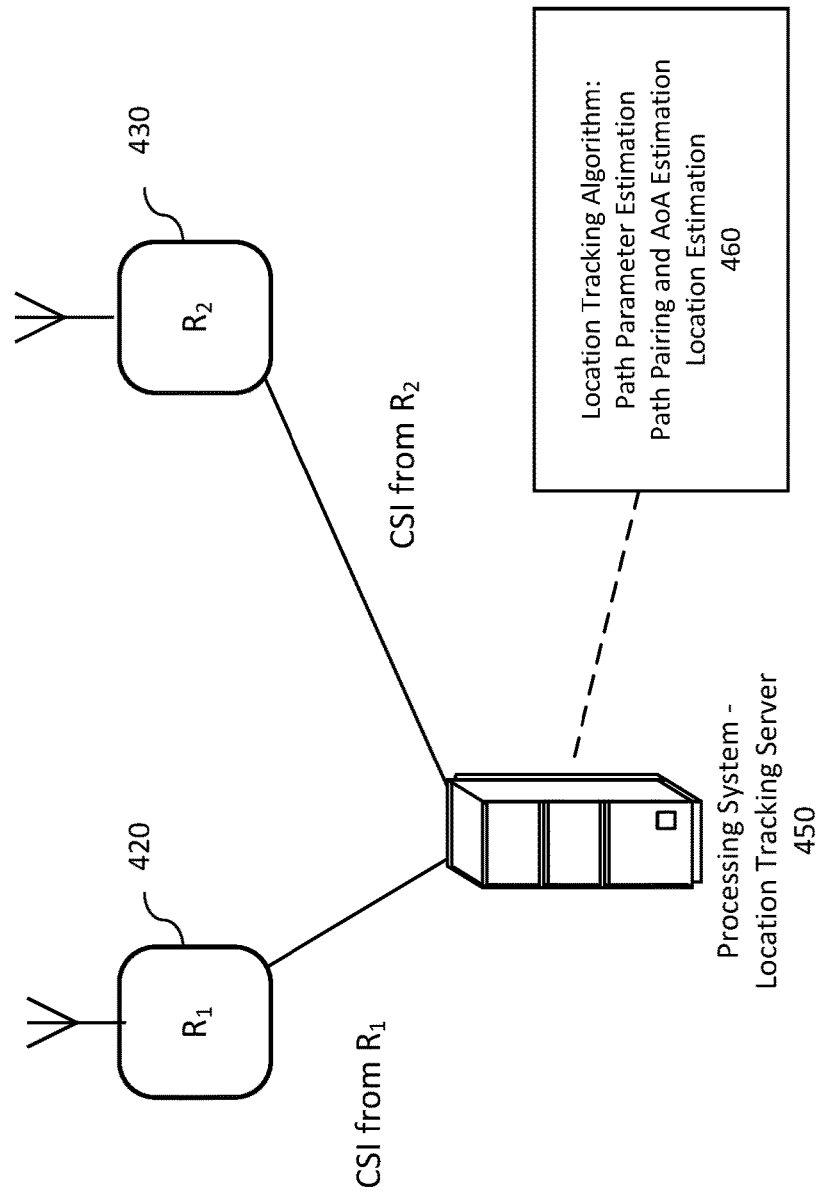
FIG. 4 illustrates server operation for passive multi-person location tracking utilizing signal polarization according to some embodiments.

FIG. 4 illustrates server operation for passive multi-person location tracking utilizing signal polarization according to some embodiments. While for simplicity FIG. 4 illustrates a single, separate location tracking server 450, which may include a Wi-Fi network controller or a dedicated processing server. However, in other embodiments the tracking analysis may be provided using a different structure, including the use multiple processing systems, processing by remote cloud systems, or processing at least in part within one or more of the Wi-Fi receivers.

In some embodiments, a processing system, referred to herein as a location tracking server 450, receives channel state information (CSI) from multiple Wi-Fi receivers, such as a first receiver ($R_1$) 420 and second receiver ($R_2$) 430, which may be Wi-Fi receivers 220 and 230 as illustrated in FIG. 2. The receivers are to receive signals including multiple reflected polarized signals from a Wi-Fi transmitter, such as Wi-Fi transmitter 210 illustrated in FIG. 2.

In some embodiments, the location tracking server 450 is to process the CSI from the receivers 420-430 to provide for location tracking of multiple persons within a tracking environment, such as persons 240 and 245 in tracking environment 200 in FIG. 2, using a location tracking algorithm 460 to perform path parameter estimation, path pairing and AoA estimation, and location estimation for human reflective targets.

The degree of change in amplitude and phase for each path varies in accordance with the electrical and geometrical properties of its interacting objects before reaching the receiver. At each receiver 420-430, the received wireless signal Y will comprise the signals from all the L paths. For each packet transmitted with the signal S, the received signal Y is given by Y=HS+N, where H represents the CSI and N represents the noise. Because the Wi-Fi network interface card (NIC) of the receiver measures CSI separately for each transmit antenna, receive antenna, subcarrier frequency, and packet sent, the CSI H can be denoted as H(p,r,f,t) where p represents a sensor in the polarization domain (transmit antenna), r represents a sensor in the spatial domain (receive antenna), f represents a sensor in the frequency domain (i.e., subcarrier), and t represents a sensor in the time domain (packet number). Thus, a CSI measurement for transmit antenna p, receive antenna r, and subcarrier f at time t is given by:

$$H(p,r,f,t) = \Sigma_{l=1}^{L} \alpha_l^p(r,f,t) e^{-j\Phi_l(r,f,t)} \quad [3]$$

In Equation [3], $\alpha_l^p$(r, f, t) represents the complex attenuation weight for the signal from transmit antenna p along path l to the receiver at sensor (r, f, t), and $\Phi_l$(r, f, t) represents the phase of the same path l at sensor (r, f, t). Taking the first space sensor $r_o$, the first subcarrier $f_o$, and the first-time sensor $t_o$ as reference, $\Phi_l$ (r, f, t) is defined by the AoA of the path $\Phi_l$, the DFS of the path $v_l$, and ToF of the path $\tau_l$ as:

$$\Phi_l(r, f, t) = 2\pi\tau_l f_0 + 2\pi\left(\tau_l(f-f_0) - \frac{fv_l(t-t_0)}{c} + \frac{f_0\delta(r,r_0)}{c}\sin(\phi)\right) \quad [4]$$

where δ(r, $r_0$) represents the physical distance between the spatial sensors r and $r_0$, and c is the speed of light.

In some embodiments, two approximations may be made for Equation [3]:

First, considering a receive antenna array of a few elements (e.g., 3 elements, such as illustrated in FIG. 3B), a short observation time window of a fraction of a second (e.g., 0.2 seconds), and a narrow bandwidth of operation (e.g., 20 MHz), the complex attenuation weight $\alpha_l^p$(r, f, t) for all sensors in the space, time, and frequency domain can be approximated as a constant $\alpha_l^p$.

Second, because the two transmit antennas are co-located (such as illustrated in FIG. 3B), the time of flight (ToF) of each path l will be approximately the same in the CSI for both transmit antennas in all the three domains of space, time and frequency. Further, the measured CSI in practice still contains some background white Gaussian noise $N(r,f,t)$. Therefore, the measured CSI at time t for receive antenna r and subcarrier f can be approximately combined with the noise as:

$$H(r,f,t) \approx \sum_{l=1}^{L} A_l e^{-j\Phi_l(r,f,t)} + N(r,f,t) \qquad [5]$$

Where $A_l=[a_l^v, a_l^h]$ represents a polarization matrix whose elements $a_l^v$ and $a_l^h$ represent the complex attenuation weights for the vertical and horizontal polarized transmit signals measured by the sensor array at the receiver, respectively. The complex attenuation weights for the vertical and horizontal polarized transmit signals can be jointly expressed as the polarization axial ratio $$\left(\text{i.e., } \gamma_l = \arctan\left(\frac{a_l^v}{a_l^h}\right)\right).$$

Thus, with the definition of $\gamma_l$ and $\Phi_l(r, f, t)$ being as provided above, each reflection path l is characterized by its complex weight matrix, a polarization axial ratio angle, an AoA, a ToF, and DFS, denoted together as a path parameter vector $\theta_l=[A_l, \gamma_l, \phi_l, \tau_l, \nu_l]$.

With the system as illustrated in FIGS. 2-4, the signal model provided in Equation [5], and the above characterization of path parameters, a system or process is to apply a machine learning (ML) estimation framework to accurately determine the $\phi_l$ for all paths $l \in L$ including the paths reflected from human body that lie along some path $k \in L$, so that each target can first be potentially identified by its $\gamma_k$ value, and then located by its AoA at two spatially separate Wi-Fi receivers. In some embodiments, a system process is to jointly estimate the parameter vector for the multiple paths at each receiver separately, by extending the ML based SAGE algorithm, the extended algorithm referred to herein as the polarization-SAGE algorithm.

Joint Maximum Likelihood Estimation of Path Parameters: In some embodiments, the polarization-SAGE algorithm is applied for joint estimation of path parameters of all L multi-paths. There is presumed a finite time duration T over which a Wi-Fi receiver records the channel matrix H from T packets of dimensions 2×R×F×T as modeled by Equation [5]. In such estimation, let $\Theta=[\theta_1, \theta_2, \ldots, \theta_L]$ containing the parameters of all L paths, and let $\kappa=(\kappa_r, \kappa_f, \kappa_t)$ such that $\kappa_r \in [1, R]$ $\kappa_f \in [1, F]$, $\kappa_t \in [1, T]$ is a valid combination of sensors in the domains of space, frequency and time respectively, such that $K_r=1$ represents the reference sensor $R_o$, $\kappa_f=1$ represents the reference sensor $F_o$, and $\kappa_t=1$ represents the reference sensor $T_o$.

Equation [5] may then be rewritten as:

$$H(\kappa) \approx \sum_{l=1}^{L} s(\kappa;\theta_l) + N(\kappa) \qquad [6]$$

Where $s(\kappa;\theta_l)=A_l e^{-j\Phi_l(r,f,t)}$.

With the above formulation in Equation [6], the SAGE algorithm may be applied to perform maximum likelihood estimation (MLE) of $\Theta$. It may be noted that the SAGE algorithm relies on two sets of data: incomplete, observable data and complete, unobservable data. The algorithm considers a measured CSI $H(\kappa)$ as the incomplete, observable data. Further, it considers each individual multipath component in the CSI, corrupted by a part of the total additive noise N as the complete, unobservable data. Denoting the observable data by the vector $X(\kappa)=[X_1(\kappa), X_2(\kappa), \ldots, X_l(\kappa)]$, the l-th multipath component of $X(\kappa)$ is given by:

$$X(\kappa) = s(\kappa; \theta_l) + \sqrt{\frac{\beta_l}{2}} N(\kappa) \qquad [7]$$

Where $\beta_l \in [0,1]$. Therefore, $H(\kappa)$ from Equation [6] can also be written as $H(\kappa)=\sum_{l=1}^{L} X_l(\kappa)$, i.e., the incomplete, observable data CSI $H(\kappa)$ is a sum of all complete, unobservable data in $X(\kappa)$.

Given the above SAGE-compatible definitions of $H(\kappa)$ and $X_l(\kappa)$, the objective of the polarization-SAGE algorithm is to obtain the maximum likelihood estimation of the path parameter $\theta_l$ given the observable data $X_l$ (i.e., $X_l(\kappa)$ for all possible $\kappa$). However, because the complete data $X_l$ for each path is unobservable, the complete data has to be first estimated from all the observed, $H(\kappa)$ using a prior estimate of all paths $\hat{\Theta}'$, before obtaining the MLE of $\theta_l$. Thus, the polarization-SAGE algorithm proceeds in the following stages:

(1) Initialization: The algorithm initializes a value for L, a prior estimate $\hat{\Theta}'$.

(2) Expectation and Maximization: The algorithm proceeds iteratively in two stages for each path 1 in L: (i) Expectation for finding $\hat{X}_l$, an estimate of $X_l$ for the current iteration and (ii) Maximization for finding the MLE of $\Theta'$ for the current iteration.

(3) Convergence: The algorithm checks for convergence at the end of each iteration, i.e., after running Expectation and Maximization on all paths. If the algorithm converges, it outputs the estimated path parameters of all paths from the current iteration. If convergence is not met, the algorithm continues with the next iteration of Expectation and Maximization.

The Initialization, Expectation, Maximization, and Convergence stages are more fully detailed below. In such explanation, the [^]superscript is used to indicate an estimated value for the current iteration and superscript ['] is used to indicate an estimated value obtained from a previous iteration.

Initialization: The polarization-SAGE algorithm sets L to a value that covers all of the dominant multi-paths, which are usually 4 to 5 in indoor environments plus the maximum number of human targets. Next, the algorithm sets the prior estimate $\hat{\Theta}'$ to all zeros and initializes an iteration counter $\mu=1$ along with a finite limit $\mu_{max}$ that limits to the maximum number of iterations in the Expectation process to $\mu_{max}$ irrespective of attaining convergence. Further, the algorithm defines a convergence threshold value of $\in_{max}$ in the same 5-Dimensional space as $\Theta$ to detect convergence of the iterations in the Expectation process. Finally, it proceeds to the two-stage iterations of Expectation and Maximization.

Expectation: In this stage, the polarization-SAGE algorithm estimates the complete, unobservable data $\widehat{X_l(\kappa)}$ using the incomplete, observable CSI data $H(\kappa)$ and the estimate from the previous iteration $\hat{\Theta}' = [\hat{\theta_1'}, \hat{\theta_2'}, \ldots, \hat{\theta_l'}]$ by taking the conditional expectation:

$$\hat{X}_l(\kappa; \hat{\Theta}')=s(\kappa; \hat{\theta_l'})+\beta_l[H(\kappa)-\sum_{l=1}^{L} s(\kappa; \hat{\theta_l'})] \qquad [8]$$

In Equation [8], the first summation term in the right hand side (RHS) stands for the contribution of the specific multipath component, and the second summation term in the RHS stands for an estimate of the additive noise, imputed by subtracting all estimated wave contributions from the received signal. The value of $\beta_l$ is set to 1, as it minimizes the convergence rate of the algorithm.

Maximization: The polarization-SAGE algorithm estimates the parameters of the multipath component $\theta_l$ using the corresponding complete data $\hat{X}_l$ estimated by the Expectation stage. Note that the parameters of $\theta_l$ can be determined by computing the MLE of the log-likelihood function $\Lambda(\theta_l; X_l)$ given by $(\hat{\theta}_l)_{ML}(\hat{X}_l)=\arg\max\{\Lambda(\theta_l; X_l)\}$, for which the log-likelihood function $\Lambda(\theta_l; X_l)$ is defined as:

$$\Lambda(\theta_l;X_l)=2\int_\kappa \Box R\{s^H(\kappa;\theta_l)X_l(\kappa)\}d\kappa - \int_\kappa \Box \|s(\kappa;\theta_l)\|^2 \quad [9]$$

With $R\{.\}$, H, and $\|.\|$ denoting the real part, Hermitian transpose, and norm of a complex matrix, respectively.

The above approach is generally computationally infeasible due to high dimensionality of $\Theta$ (i.e., 5L). However, if the integral in Equation [9] is approximated by the discrete sample summation over all values of x along with the substitution of $s(\kappa; \theta_l)=A_l e^{-j\Phi_l(\kappa)}$, the MLE estimate $(\hat{\theta}_l)_{ML}(\hat{X}_l)$ may be shown to be equal to the values of $\theta_l$ that maximizes the cost function z whose parameters are only the phase-dependent parameters of $\theta_l$ (i.e., $[\phi_l, \tau_l, v_l]$), and the estimated observed data $\hat{X}_l$. In other words, $$(\hat{\theta}_l)_{ML}(\hat{X}_l) \equiv \arg\max_{\phi_l,\tau_l,v_l}\{z(\phi_l, \tau_l, v_l; \hat{X}_l)\}.$$

The cost function $z(\phi_l, \tau_l, v_l; \hat{X}_l)$ has a structure similar to Equation [4], but is opposite in the sign of the exponent of equation [3], given by:

$$z(\phi_l, \tau_l, v_l; \hat{X}_l) = \quad [10]$$
$$\sum_{r=r_0}^{R}\sum_{f=f_0}^{F}\sum_{t=t_0}^{T}\hat{X}_l(r,f,t)\exp\left[j2\pi\left(\tau_l(f-f_0) - \frac{fv_l(t-t_0)}{c} + \frac{f_0\delta(r,r_0)\sin(\phi)}{c}\right)\right]$$

Thus, in the Maximization stage, the polarization-SAGE algorithm first takes the estimated $\hat{X}_l$ from the Expectation stage and finds the solution of $$\arg\max_{\phi_l,\tau_l,v_l}\{z(\phi_l, \tau_l, v_l; \hat{X}_l)\}.$$

Because the solution of $$\arg\max_{\phi_l,\tau_l,v_l}\{z(\phi_l, \tau_l, v_l; \hat{X}_l)\}$$

is a three-dimensional optimization problem and computationally intensive, WiPolar follows SAGE by reducing the computational complexity of three-dimensional optimization by performing three successive one-dimensional procedures, where each of the three phase-based path parameters (i.e., $\phi_l, \tau_l, v_l$) for the current iteration is estimated sequentially as:

$$\hat{\tau}_l = \arg\max_\tau |z(\hat{\phi}'_l, \tau, \hat{v}'_l; \hat{X}_l)| \quad [11]$$

$$\hat{\phi}_l = \arg\max_\phi |z(\phi, \hat{\tau}, \hat{v}'_l; \hat{X}_l)| \quad [12]$$

$$\hat{v}_l = \arg\max_v |z(\hat{\phi}'_l, \hat{\tau}, v_l; \hat{X}_l)| \quad [13]$$

Finally, with the above three estimated phase-based parameters $\hat{\phi}_l, \hat{\tau}_l,$ and $\hat{v}_l$, and the 4-Dimensional matrix $\hat{X}_l$ (i.e., $\hat{X}_l \in \mathbb{R}^{2\times R\times F\times T}$), the algorithm's Maximization stage estimates the attenuation weights for the vertical and horizontal polarized transmit signals along with their polarization axial ratio parameter $\hat{\gamma}_l$ as:

$$[\hat{\alpha}_V, \hat{\alpha}_H] = \frac{z(\hat{\phi}_l, \hat{\tau}_l, \hat{v}_l; \hat{X}_l)}{RFT} \quad [14]$$

$$\hat{\gamma}_l = \arctan\left(\frac{\hat{\alpha}_V}{\hat{\alpha}_H}\right) \quad [15]$$

$$\hat{A}_l = [\hat{\alpha}_V, \hat{\alpha}_H] \quad [16]$$

Convergence: After the Maximization stage of each iteration, the absolute difference $\in$ between the latest path parameter estimates $\hat{\Theta}$ and the previous iteration path parameter estimates $\hat{\Theta}'$ is compared against the threshold $\in_{max}$. The algorithm is considered to have converged if $\in < \in_{max}$ and the latest path parameter estimates $\hat{\Theta}$ are output by the algorithm. If convergence is not met, the iteration counter $\mu$ increases by 1 and the algorithm proceeds to another iteration of the second step unless $\mu=\mu_{max}$, for which the latest path parameter estimates $\hat{\Theta}$ are output as the result of the Polarization-SAGE algorithm for the next step of mobile path identification and matching.

Localization of Human Targets: In some embodiments, the WiPolar system or process is to track the position of each person in a tracking environment using the path parameters from two (or more) Wi-Fi receivers $R_1$ and $R_2$. Given L estimated path parameters for two receivers $\Theta^{R_1}$ and $\Theta^{R_2}$, a system or process is first to match pairs of path parameters for each human location. Then, the system or process is to find the location of each person utilizing the AoAs of each reflection path. Further details regarding Path Pairing and Localization may include the following:

(1) Path Pairing: In the Path Pairing process, for each time window x, the system or process is to consider all possible pairs of path parameter vectors $<\theta_i, \theta_j>$ such that $\theta_i \in \Theta_x^{R_1}$ and $\theta_j \in \Theta_x^{R_2}$, and assigns a score that represents the likelihood of a match being a combination of path parameters at the two receivers that arise from the l-th reflector in the tracking environment.

To score all the pairs, the system or process is to leverage the polarization axial ratio angle. Because each reflector (such as human subject) has a unique horizontal and vertical radar cross section irrespective of its location, the ratio of the target's reflected signal for the vertical polarized transmit signal to that of the horizontal polarized transmit signal remain largely static for small amount of time (e.g., 0.2 second). Therefore, a specific reflector will yield a similar polarization axial ratio angle at both receivers, and consequently, the reflector's AoAs at both the receivers can be combined with the known position of the receivers to derive the location of the reflector. The system or process is to devise its similarity score for a given pair $<\theta_i, \theta_j>$ on the basis of their amplitude in vertical polarization $(\hat{\alpha}_V)$ and the polarization axial ratio angle $\gamma$. Specifically, for $\theta_i=[\alpha_V^i, \alpha_H^i, \gamma_i, \phi_i, \tau_i, v_i]$ and $\theta_j=[\alpha_V^j, \alpha_H^j, \gamma_j, \phi_j, \tau_j, v_j]$, the system or process is to compute the similarity score $$\sigma_{ij} = \frac{\epsilon \alpha_V^i \alpha_V^j}{d_2(\gamma_i, \gamma_j)}, \text{ where } d_2(\cdot)$$

represents the Euclidean distance and E represents a weight for the product of the vertical polarization magnitudes. In a particular implementation, there is an empirical setting of ∈=0.2. Considering up to two dominant static multipaths and K human reflection paths, the system or process then selects all the AoA pairs $\Omega = <\phi_i^1, \phi_j^1>$, $<\phi_i^2, \phi_j^2>$, ..., $<\phi_i^{K+2}, \phi_j^{K+2}>$ of top K+2 pairs of $<\theta_i, \theta_j>$ in decreasing order of their similarity score $\sigma_{ij}$ for localization.

(2) Localization of Human Targets: The system or process is then to use the top K+2 AoA pairs in $\Omega$ from each time window to locate the human targets in a tracking environment. Given the distance D between the receivers $R_1$ and $R_2$ and the pair of AoAs at $R_1$ and $R_2$ $[\phi_a, \phi_b] \in \Omega$, the system or process is to output a 2D Location pair l=(x,y) using the Triangle sine rule as:

$$x = D \times \frac{\sin(\phi_a)}{\sin(\pi - (\phi_a + \phi_b))},$$

$$y = D \times \frac{\sin(\phi_b)}{\sin(\pi - (\phi_a + \phi_b))}.$$

Thus, the system or process converts the set of aggregated AoA pairs $\Omega$ into a set of 2D Location pairs L. The system or process then runs a clustering algorithm to identify groups of the output locations. Because the human paths are relatively more dynamic than static paths even when standing still due to subtle movements such as breathing, the clusters corresponding to the static paths will be tighter than the human reflected paths. Because the input data for clustering is generated by aggregating the angle parameters of K+2 paths, the number of expected clusters will be K+2. Given the above expected number of clusters, along with the values of L in the two-dimensional Cartesian space, the system or process uses the K-Means algorithm with the Euclidean distance metric and K+2 as the number of clusters to cluster the locations in L.

Figure 5:
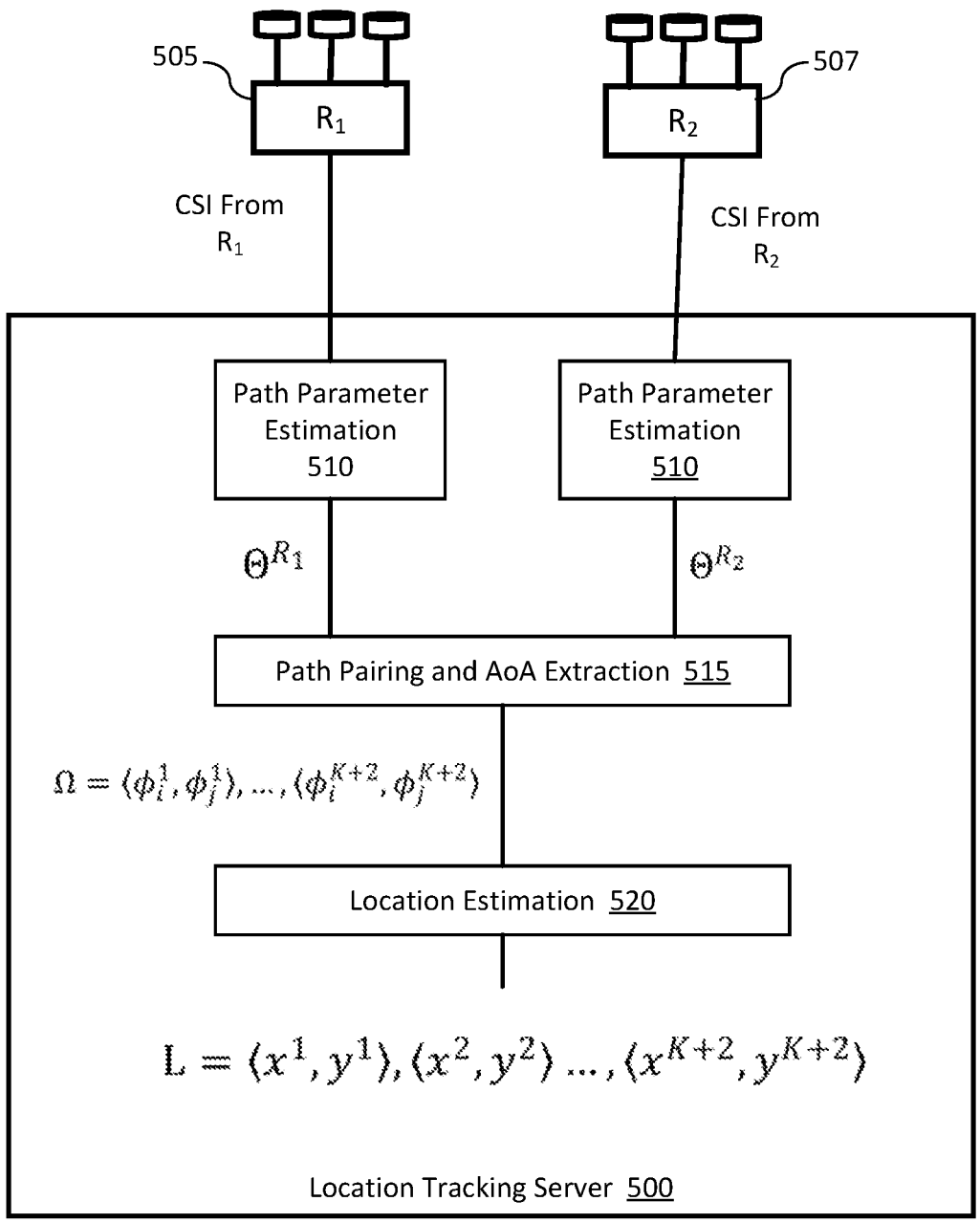
FIG. 5 illustrates operations in a location tracking server for passive multi-person tracking according to some embodiments.

FIG. 5 illustrates operations in a location tracking server for passive multi-person tracking according to some embodiments. FIG. 5 illustrates an overall multi-person tracking system operation, as more fully described above.

As shown in FIG. 5, the CSIs collected from each Wi-Fi receiver, such as a first receiver 505 ($R_1$) and a second receiver 507 ($R_2$), are delivered to a location tracking server 500, which may include a Wi-Fi network controller, a dedicated processing server, or other processing element or combination of processing elements. From the CSI for each receiver, parameter estimation is performed 510, the path parameter vector $\Theta$ being independently estimated using the Expectation Maximization algorithm described above (Polarization-SAGE). In some embodiments, the pairs of path parameter vectors $<\theta_i, \theta_j>$ and the corresponding AoA pairs $\Omega$ are selected during a path-pairing process 515. The AoA pairs then are converted into positions of the human subjects within the tracking environment in 2D space 520. The resulting data may then be delivered to a higher-level application, including, but not limited to, a security surveillance system.

Figure 6:
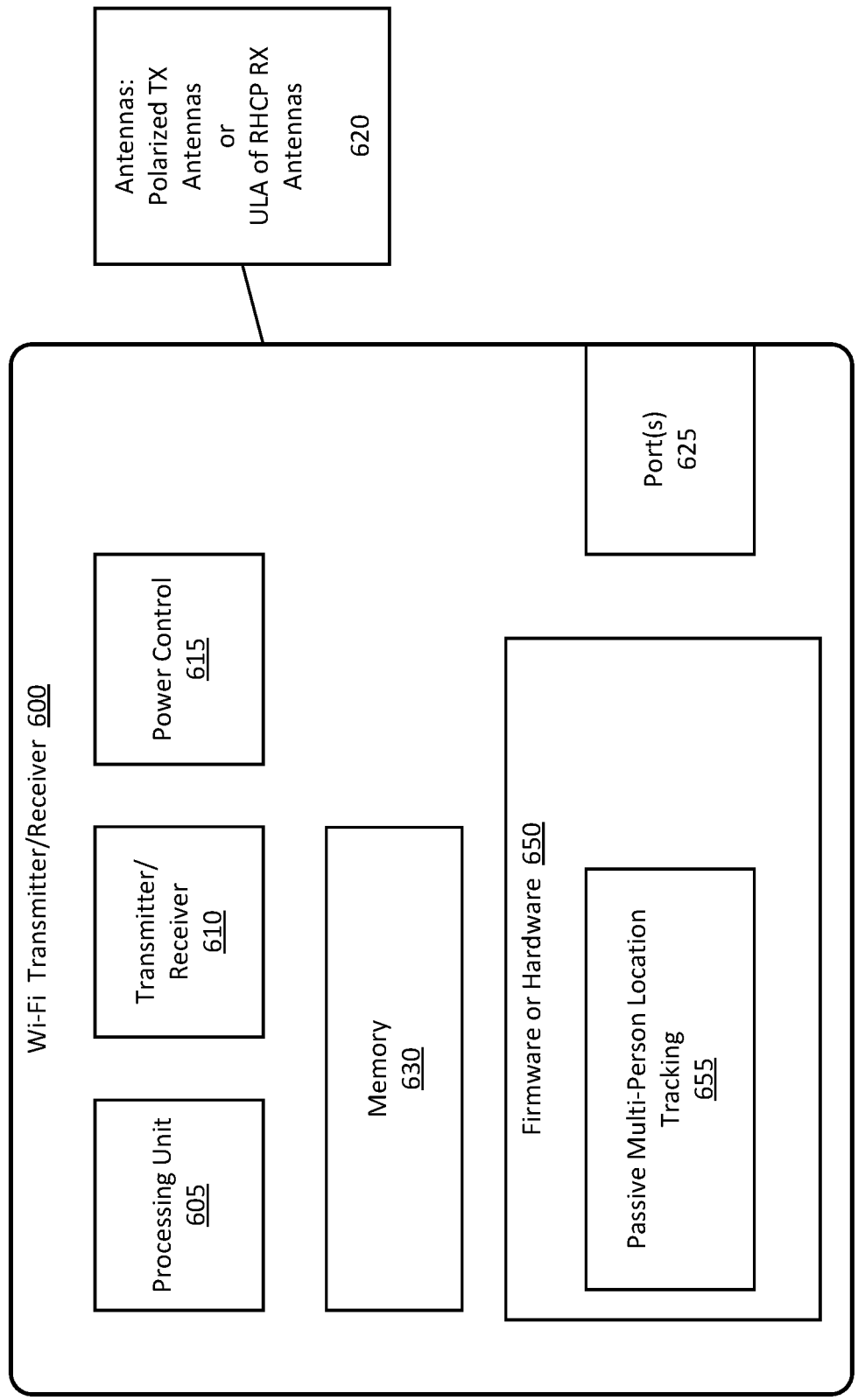
FIG. 6 is block diagram to illustrate an access point to provide Wi-Fi transmission or reception for passive multi-person tracking according to some embodiments.

FIG. 6 is block diagram to illustrate an access point to provide Wi-Fi transmission or reception for passive multi-person tracking according to some embodiments. An access point includes additional components and elements not illustrated in FIG. 6, which is simplified for sake of illustration. The illustrated Wi-Fi transmitter or receiver 600 may include an access point operating under one or more IEEE 802.11 standards, such as Wi-Fi access point transmitter 210 or Wi-Fi access point receiver 220-230 illustrated in FIG. 2.

In some embodiments, the Wi-Fi transmitter or receiver 600 includes a processing unit 605, a transmitter and/or receiver 610, power control 615, and one or more antennas 620 for wireless signal communication. In some embodiments, the one or more antennas 620 include at least one of a pair of co-located polarized transmission antennas for a Wi-Fi transmitter, as illustrated in FIG. 3A, or a uniform linear array of antennas for a Wi-Fi receiver, as illustrated in FIG. 3B. The Wi-Fi transmitter or receiver 600 may further include one or more ports 625 for network connections or other connections, and a memory 630 for storage of data, which may include volatile and nonvolatile memory (including flash memory and similar elements), registers, and other storage technologies.

In some embodiments, the Wi-Fi transmitter or receiver 600 may further includes firmware or hardware or both 650 to provide control for passive multi-person tracking operation, such as illustrated in FIGS. 1-5.

Figure 7:
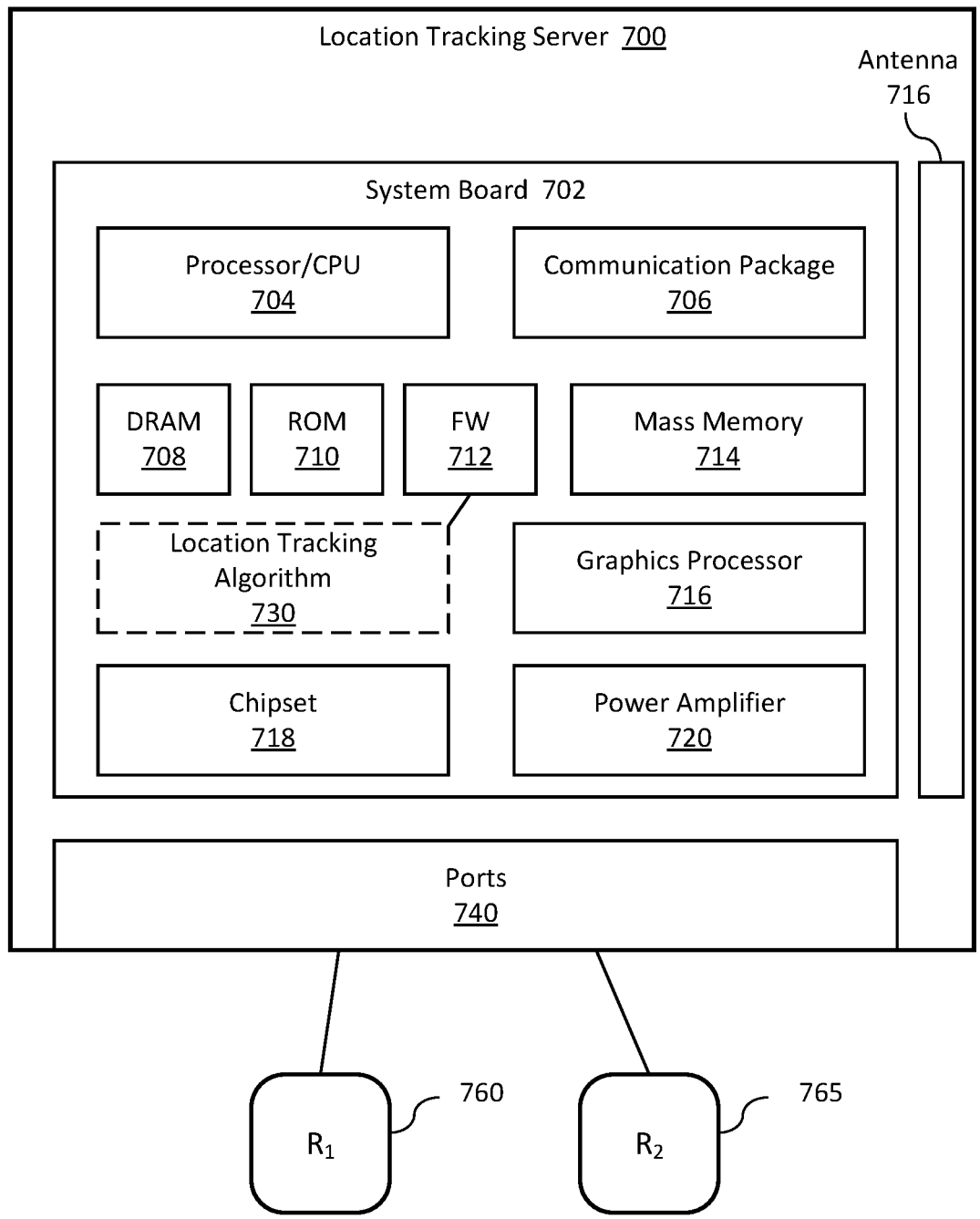
FIG. 7 illustrates components of a location tracking server according to some embodiments.

FIG. 7 illustrates components of a location tracking server according to some embodiments. In some embodiments, a location tracking server 700 may include a Wi-Fi network controller or a dedicated processing server, such as location tracking server 450 illustrated in FIG. 4. The location tracking server 700 may include a system board 702 (which may also be referred to as a motherboard, main circuit board, or other terms). The board 702 may include a number of components, including but not limited to a processor 704, such as a central processing unit (CPU), and at least one communication package or chip 706. The communication package 706 may be coupled to one or more antennas 716. The processor 704 is physically and electrically coupled to the board 702.

In some embodiments, the location tracking server 700 includes one or more ports 740 for connection to multiple Wi-Fi receivers, illustrated as a first receiver ($R_1$) 760 and a second Wi-Fi receive ($R_2$) 765, such as Wi-Fi receivers 220-230 illustrated in FIG. 2. In some embodiments, the location tracking server 700 includes implementation of a location tracking algorithm 730, which may be at least partially implemented in firmware (FW) 712, to provide for passive multi-person location tracking utilizing signal polarization. The location tracking algorithm 730 may operate as illustrated in FIG. 5 for location tracking server 500, including path parameter estimation based on CSI from Wi-Fi receivers 760-765, path pairing and AoA estimation, and location estimation.

The location tracking server 700 may include other components that may or may not be physically and electrically coupled to the board 702. These other components include, but are not limited to, volatile memory (e.g., DRAM) 708, nonvolatile memory (e.g., ROM) 710, flash memory (not shown), a mass memory 714 (such as a solid state drive (SSD) or hard drive), a graphics processor 716, a digital signal processor (not shown), a crypto processor (not shown), a chipset 718, a power amplifier 720. These components may be connected to the system board 702, mounted to the system board, or combined with any of the other components.

The communication package 706 enables wireless and/or wired communications for the transfer of data to and from the location tracking server 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The location tracking server 700 may include a plurality of communication packages 706. For instance, a first communication package 706 may be dedicated to shorter range wireless communications such as Wi-Fi and Bluetooth and a second communication package 706 may be dedicated to longer range wireless communications such as GSM, EDGE, GPRS, CDMA, WiMAX, LTE, Ev-DO, and others.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a system includes a plurality of receivers, including a first receiver at a first location and a second receiver at a second location, each of the plurality of receivers including one or more receiver antennas to receive polarized radio signals; a transmitter located at a third location to transmit a plurality of polarized radio signals, the transmitter including antennas for transmission of a first signal at a first polarization direction and transmission of a second signal at a second, different polarization direction; and a processing system to receive channel state information from each of the plurality of receivers, and to track a plurality of individuals in a region utilizing the received channel state information, wherein the tracking of the plurality of individuals is based at least in part on analysis of a polarization parameter and a set of location parameters that are generated for each of plurality of reflection paths based on the channel state information for each of the plurality of receivers.

In some embodiments, one or more non-transitory computer-readable storage mediums have stored thereon executable computer program instructions that, when executed by one or more processors, cause the one or more processors to perform operations including receiving channel state information for received signals from each of a plurality of receivers, the plurality of receivers including a first receiver and a second receiver, the received signals being reflections of a first signal transmitted at a first polarization direction and a second signal transmitted at a second polarization direction; determining a polarization parameter and a set of location parameters for each of a plurality of reflection paths at each of the plurality of receivers; combining reflection paths across the plurality of receivers to identify reflections for a plurality of persons; and determining a location for each of the plurality of persons based at least in part on the set of location parameters for each of the plurality of reflection paths at each of the plurality of receivers.

In some embodiments, method for passive multi-person location tracking utilizing signal polarization includes transmitting polarized radio signals from a Wi-Fi transmitter at a first location, the polarized signals including a first signal transmitted with a horizontal polarization and a second signal transmitted with vertical polarization, the signals being transmitted in a tracking environment; receiving reflected signals from the tracking environment at a first receiver at a first location and a second receiver at a second location, each of the first and second receivers including one or more receiver antennas to receive polarized radio signals; receiving channel state information at a location tracking server from the first receiver and the second receiver; generating a polarization parameter and a set of location parameters based on the channel state information received from the first receiver and the second receiver; combining of reflection paths at first and second receivers that have a closest polarization parameter to identify a plurality of persons in the tracking environment; and determining a location of each of plurality of persons in the tracking environment using the set of location parameters.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A system comprising:
    a plurality of receivers, including a first receiver at a first location and a second receiver at a second location, each of the plurality of receivers including one or more receiver antennas to receive polarized radio signals;
    a transmitter located at a third location to transmit a plurality of polarized radio signals, the transmitter including antennas for transmission of a first signal at a first polarization direction and transmission of a second signal at a second, different polarization direction; and
    a processing system to receive channel state information from each of the plurality of receivers, and to track a plurality of individuals utilizing the received channel state information;
    wherein the tracking of the plurality of individuals is based at least in part on analysis of a polarization parameter and a set of location parameters that are generated for each of plurality of reflection paths based on the channel state information for each of the plurality of receivers.

2. The system of claim 1, wherein the antennas of the transmitter include a first transmitter antenna to transmit the first signal at the first polarization and a second transmitter antenna to transmit the second signal at the second polarization, wherein the first transmitter antenna and the second transmitter antenna are co-located.

3. The system of claim 2, wherein the first polarization direction is horizontal polarization and the second polarization direction is vertical polarization.

4. The system of claim 1, wherein the one or more receiver antennas of each of the plurality of receivers includes uniform linear array (ULA) of antennas.

5. The system of claim 1, wherein the processing system includes one of:
    a dedicated processing server; or
    a network controller.

6. The system of claim 1, wherein the set of location parameters includes:
    time of flight (ToF);
    angle of arrival (AoA); and
    dynamic frequency selection (DFS).

7. The system of claim 1, wherein the polarization parameter is a polarization axial ratio angle.

8. The system of claim 1, wherein the tracking of the plurality of individuals includes:
    combining of reflection paths at each of the plurality of receivers that have a closest polarization parameter to identify reflective targets; and
    localization of the identified reflective targets using the set of location parameters.

9. The system of claim 1, wherein the tracking of the plurality of receivers includes application of a machine learning estimation framework to estimate one or more parameters for the plurality of reflective paths.

10. The system of claim 1, wherein each of the transmitter and plurality of receivers is a Wi-Fi access point.

11. One or more non-transitory computer-readable storage mediums having stored thereon executable computer program instructions that, when executed by one or more processors, cause the one or more processors to perform operations comprising:
    receiving channel state information for received signals from each of a plurality of receivers, the plurality of receivers including a first receiver and a second receiver, the received signals being reflections of a first signal transmitted at a first polarization direction and a second signal transmitted at a second polarization direction;
    determining a polarization parameter and a set of location parameters for each of a plurality of reflection paths at each of the plurality of receivers;
    combining reflection paths across the plurality of receivers to identify reflections for a plurality of persons; and determining a location for each of the plurality of persons based at least in part on the set of location parameters for each of the plurality of reflection paths at each of the plurality of receivers.

12. The one or more mediums of claim 11, wherein the first polarization direction is horizontal polarization and the second polarization direction is vertical polarization.

13. The one or more mediums of claim 11, wherein the set of location parameters includes:
time of flight (ToF);
angle of arrival (AoA); and
dynamic frequency selection (DFS).

14. The one or more mediums of claim 11, wherein the polarization parameter is generated by determining a ratio of amplitudes of the polarized signals in the first polarization direction and in the second polarization direction.

15. The one or more mediums of claim 11, further comprising executable computer program instructions that, when executed by the one or more processors, cause the one or more processors to perform operations comprising:
combining reflection paths at each of the plurality of receivers that have a closest polarization parameter to identify reflective targets; and
localization of the identified reflective targets using the set of location parameters.

16. The one or more mediums of claim 11, further comprising executable computer program instructions that, when executed by the one or more processors, cause the one or more processors to perform operations comprising:
estimating one or more parameters for the plurality of reflective paths utilizing a machine learning estimation framework.

17. A method for passive multi-person location tracking utilizing signal polarization comprising:
transmitting polarized radio signals from a Wi-Fi transmitter at a first location, the polarized signals including a first signal transmitted with a horizontal polarization and a second signal transmitted with vertical polarization, the signals being transmitted in a tracking environment;
receiving reflected signals from the tracking environment at a first receiver at a first location and a second receiver at a second location, each of the first and second receivers including one or more receiver antennas to receive polarized radio signals;
receiving channel state information at a location tracking server from the first receiver and the second receiver;
generating a polarization parameter and a set of location parameters based on the channel state information received from the first receiver and the second receiver;
combining of reflection paths at first and second receivers that have a closest polarization parameter to identify a plurality of persons in the tracking environment; and
determining a location of each of plurality of persons in the tracking environment using the set of location parameters.

18. The method of claim 17, wherein the polarized signals are transmitted utilizing a first transmitter antenna to transmit the first signal at the horizontal polarization and a second transmitter antenna to transmit the second signal at the vertical polarization, the first transmitter antenna and the second transmitter antenna being co-located, and wherein each of the first and second receivers includes uniform linear array (ULA) of circular polarization antennas.

19. The method of claim 17, wherein the set of location parameters includes:
time of flight (ToF);
angle of arrival (AoA); and
dynamic frequency selection (DFS).

20. The method of claim 17, wherein the polarization parameter is a polarization axial ratio angle.

* * * * *